June 14, 1960 W. HONOLKA 2,941,036

ELECTRICAL SIGNAL SCRAMBLING AND UNSCRAMBLING APPARATUS

Filed July 23, 1956 2 Sheets-Sheet 1

INVENTOR.
Walter Honolka

BY

Michael S. Striker
Attorney

June 14, 1960 W. HONOLKA 2,941,036

ELECTRICAL SIGNAL SCRAMBLING AND UNSCRAMBLING APPARATUS

Filed July 23, 1956 2 Sheets-Sheet 2

INVENTOR.
Walter Honolka

BY

Michael S. Striker
Attorney 2,941,036

ELECTRICAL SIGNAL SCRAMBLING AND UNSCRAMBLING APPARATUS

Walter Honolka, Stuttgart, Germany, assignor to Firma Bölkow Entwicklungen Kommanditgesellschaft of Stuttgart Filed July 23, 1956, Ser. No. 599,507

Claims priority, application Germany July 23, 1955

8 Claims. (Cl. 179—1.5)

The present invention relates to an apparatus used in the transmission and reception of information by means of electrical signals. More particularly, the present invention relates to an apparatus for scrambling and unscrambling electrical signals used for transmitting information.

For many purposes, today, it is necessary and desirable to transmit information by means of electrical signals. Such information can include the printed word or can include facsimile transmission for transmitting and receiving pictures and the like. There are many times when the information transmitted between the transmitting and receiving stations is desired to be kept confidential so that such information would be rendered unintelligible to unauthorized listeners or receiving stations.

In my copending United States patent applications Serial Nos. 599,412 and 599,506, both filed on July 23, 1956, I have described different apparatus for rendering the information transmitted by the electrical signals unintelligible if intercepted by unauthorized listeners or receiving stations. The electrical signals used for transmitting the information are varied in accordance with the method and apparatus described in the above-mentioned copending patent application.

These electrical signals are varied by recording the same on magnetic tape and by reproducing the recorded electrical signals with a reproducing head which is moved with respect to the magnetic tape in accordance with a cam track pattern so that the electrical signals reproduced by the moving reproducing head are modulated. In order to properly reproduce the modulated electrical signals, it is necessary that the receiving station be equipped with a recording head which is moved and synchronized with the movements of the reproducing head in the transmitting station. The movements of the recording head at the receiving station are sufficient to demodulate the received electrical signals so that they correspond to the electrical signals originally recorded at the transmitting station.

In order to prevent unauthorized listeners and receiving stations from intercepting the transmitted electrical signals and unscrambling the same it is necessary to use irregular cam track portions which cannot be duplicated by unauthorized listeners.

It is accordingly the cam track pattern which is used for scrambling and unscrambling the electrical signals in the transmission and reception thereof. In order to insure complete safety in transmission and reception of the information it is desirable to change the cam track pattern at various intervals in the event that such patterns might become known through continued usage thereof.

It is accordingly an object of the present invention to provide a new and improved scrambling and unscrambling apparatus using cam track patterns for quickly and easily varying the cam track patterns to form new patterns.

It is a second object of the present invention to provide such cam track pattern varying apparatus which is very small in physical size and economical to construct.

Another object of the present invention is to provide new and improved variable scrambling and unscrambling apparatus for use in a transmission and reception of information by electrical signals.

It is a further object of the present invention to provide cam track pattern varying apparatus which can be manually operated to change the cam track pattern without disassembling the scrambling and unscrambling apparatus.

It is a further object of the present invention to provide scrambling and unscrambling apparatus which renders the electrical signals unintelligible by introducing a modulating frequency in the audio frequency range.

With the above objects in view, the present invention mainly consists of a variable scrambling and unscrambling apparatus for use in the transmission and reception of information by electrical signals, including a base member, a support member mounted on the base member, a plurality of cam members, each of the cam members respectively having a cam track portion, means for mounting the cam members on the support member in a plurality of different mounting positions so that the cam track portions of the cam members cooperate to provide different respective cam track patterns for each of the different mounting positions, at least one cam follower movably mounted on the base member and adapted to engage the cam track, means for providing relative movement between the cam follower and the cam track so that the cam follower is moved by the cam track in accordance with the particular cam track pattern, and electrical signal transmitting and receiving means mounted on the base member and controlled by the cam follower to vary the transmission and reception of the electrical signals in accordance with the cam track pattern thereby respectively scrambling and unscrambling the electrical signals.

In a preferred embodiment of the present invention, each of the cam members is disk-shaped and is provided with a cam track portion at the periphery thereof. In a further improvement, a switching mechanism is provided which cooperates with the disk-shaped cam members so that the cam track portions thereof can be moved to different relative positions and thereby provide different cam track patterns.

In accordance with the present invention the cam track moves a cam follower which controls the movement of recording and/or reproducing heads in accordance with the cam track pattern. Such movement varies the electrical signals occurring at the recording and reproducing heads to modulate these signals in a predetermined manner depending upon the particular cam track pattern.

In a preferred embodiment of the switching mechanism, a selector plate is provided which is similar to the dial selector on a dial telephone. Therefore the cam track pattern may be changed simply by dialing a desired pattern in the proper sequence.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
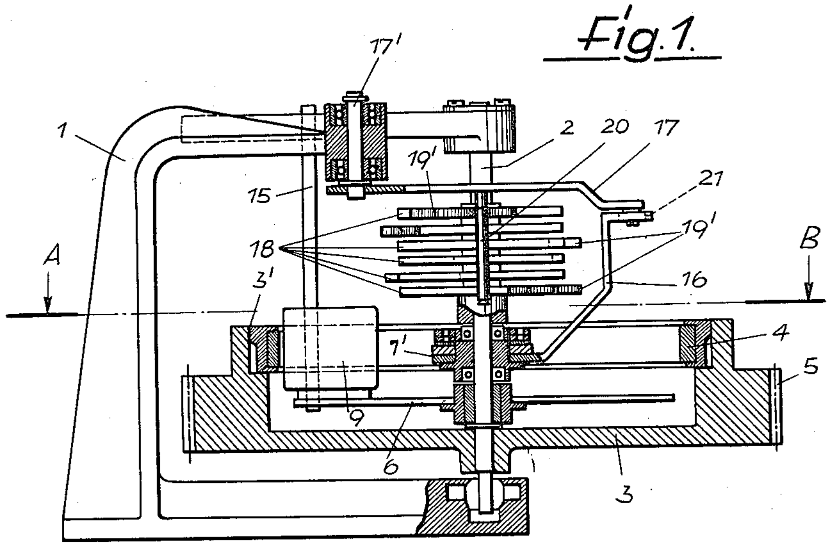
Fig. 1 is a side elevational view of an embodiment of the present invention.
Figure 2:
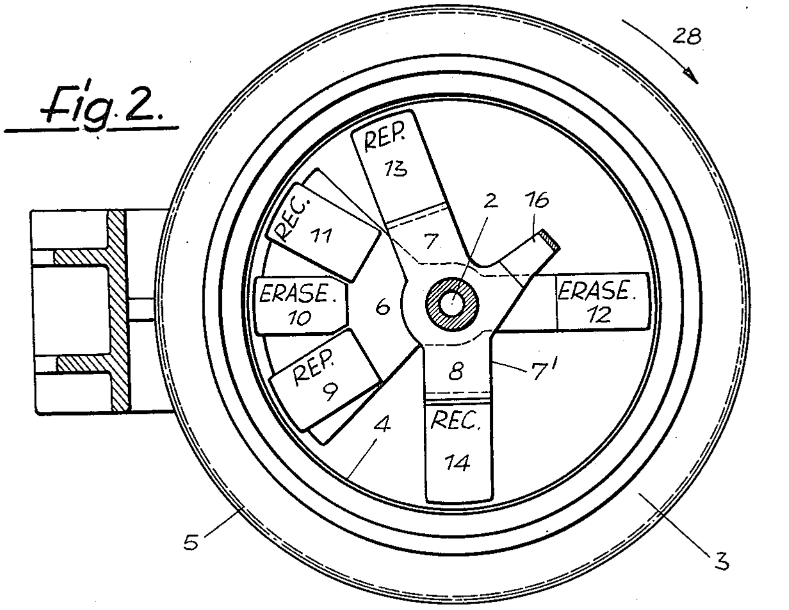
Fig. 2 is a sectional view of Fig. 1 taken along line A—B.

Referring to the drawings and more particularly to Figs. 1 and 2 it can be seen that the entire apparatus is mounted on a base member 1. Vertically mounted on the base member 1 is a shaft 2 which is adapted to rotate in ball bearings at opposite ends thereof.

Fixedly connected to the lower end of the rotatable shaft 2 and adapted to rotate therewith is a supporting member 3 having an inner cylindrical face 3'. Mounted on the inner cylindrical face 3' of the supporting member 3 is a record carrier 4 which may be in the form of an annular magnetic tape affixed to the inner surface 3'. It can be seen that the outer cylindrical surface of the support member 3 is formed with a plurality of gear teeth 5 which is adapted to be engaged by a driving gear, not shown, in order to rotate the support member 3 together with the shaft 2.

Also mounted near the lower end of the shaft 2 is a carrying arm 6 which is fixedly connected to the base member 1 by means of a rod 15 so that the carrying arm 6 does not rotate with the shaft 2 in the event of rotation thereof. In Fig. 2, it can be seen that the carrying arm 6 has opposite end portions on which are mounted recording and reproducing heads 9, 10, 11 and 12. Actually, the head 9 is a reproducing head; the head 10 is an erasing head; the head 11 is a recording head and the head 12 is a second erasing head. It can be seen that each of the heads 9–12 have outer edge portions which cooperate with the magnetic tape 4 and are adapted to record electrical signals thereon, reproduce electrical signals therefrom or to erase electrical signals or other magnetization from the magnetic tape 4, in accordance with respective functions thereof.

Mounted above the carrying arm 6 is a second carrying arm 7' having opposite projecting portions 7 and 8. The carrying arm 7' is mounted on the shaft 2 but does not rotate with the shaft 2 due to construction which will be explained hereinafter. Mounted on the projection 7 of the carrying arm 7' is a reproducing head 13 and mounted on the projection 8 is a recording head 14.

In Fig. 2 it can be seen that the reproducing head 13 also cooperates with the magnetic tape 4 to reproduce electrical signals from the magnetization of the magnetic tape and that the recording head 14 cooperates with the magnetic tape to record electrical signals thereon.

The second carrying arm 7' has an upwardly projecting member 16 which contacts at the upper end thereof a roller 21 mounted on an arm 17 which is connected at its other end to a shaft 17' pivotally mounted on the base member 1.

Figures 3, 4, 5:
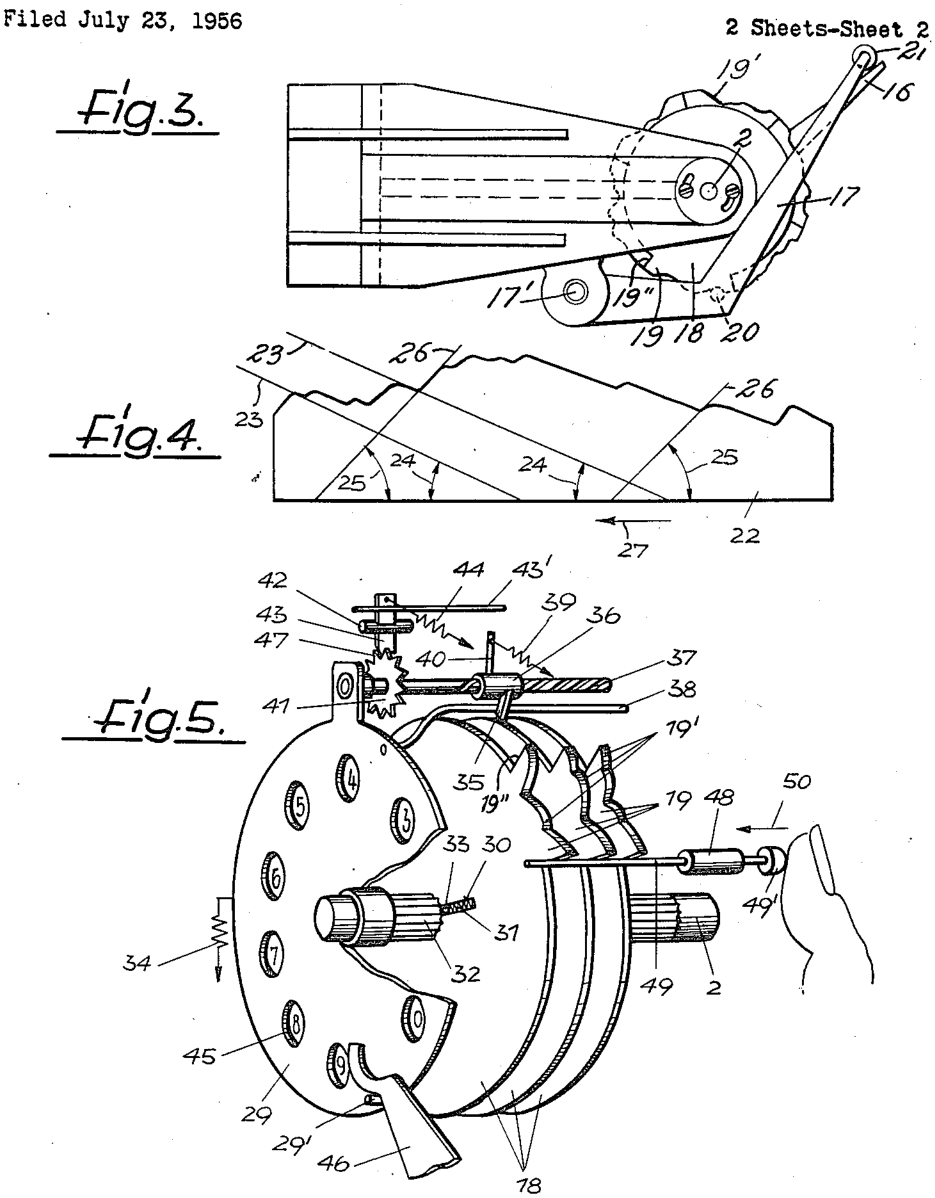
Fig. 3 is a partial plan view of the upper part of the apparatus shown in Fig. 1.
Fig. 4 is a development of a cam track to show the particular arrangement thereof used in the present invention.
Fig. 5 is a perspective view of the switching mechanism incorporated in the present invention for changing the cam track pattern whenever desired.

In Fig. 3 it can be seen that the point of contact between the roller 21, the free end portion of the projection 16 and the shaft 17' are all aligned in the plane of the axis of the shaft 2. The purpose for these constructional details will be explained hereinbelow.

Mounted above the carrying arm 7' are a plurality of parallel disk-shaped cam members 18 each of which has a projection 19 of a certain peripheral length with an edge face forming a cam track portion 19'. This can best be seen in the perspective view of Fig. 5. The cam members 18 are mounted on the rotatable shaft 2 so as to rotate therewith.

In Fig. 3 it can be seen that the projections 19 and the edge faces 19' of each of the angularly displaced cam members to their relative positions as shown cooperate with one another to form a closed cam track. Engaging this cam track is a cam follower 20 which is mounted beneath the lower face of the arm 17 and which is long enough in the axial direction to engage each of the cam members 18, as can be seen in Fig. 1. The cam follower 20 engages the cam track in the following manner. A spring, not shown, is provided to urge the arm 16 together with the carrying arm 7' in the counterclockwise direction as seen in Figs. 2 and 3. The engagement of the free end portion of the arm 16 with the roller 21 mounted on the free end portion of the arm 17 moves the cam follower 20 into engagement with the cam track formed by the cam track portions 19'. This spring may be a conventional spring which is provided in a known manner and is not illustrated in order to avoid unnecessarily complicating the drawing. However, the pressure of the spring is so chosen that it does not prevent the rotation of the cam members with respect to the cam follower 20.

In operation, the support member 3 is rotated by driving the peripheral gear teeth 5 thereof in the clockwise direction as shown by the arrow 28 in Fig. 2. The rotation of the support member 3 also causes the rotation of the shaft 2 which accordingly rotates the cam members 18 mounted thereon.

As the cam members rotate, it can be seen that the cam follower 20 in Fig. 3 is urged against different portions of the cam track so that the cam follower moves radially inward towards the shaft 2 and radially outward away from the shaft 2 depending on the projections 19 on the respective cam members 18.

This inward and outward movement causes a corresponding movement of the arm 17 and the arm 16 due to the roller 21. As the arm 16 pivots back and forth about the shaft 2, the projections 7 and 8 respectively carrying the reproducing head 13 and recording head 14 also pivot about the shaft 2. This enables the recording head 14 and the reproducing head 13 to scramble and unscramble electrical signals being respectively received and transmitted through the apparatus. The complete operation of such transmitting and receiving stations is fully described in my above-listed copending U.S. patent applications. However, a short description of such operation will be included hereinbelow.

If the apparatus shown in the drawings is to be used in the transmitting station, the electrical signals to be transmitted are applied to the recording head 11 of Fig. 2 which records the signals on the magnetic tape 4. It should be noted that the recording head 11 is stationary and accordingly the electrical signals are recorded exactly as they originate. Since the magnetic tape 4 is rotating in the clockwise direction, the reproducing head 13 reproduces the electrical signals recorded on the magnetic tape and from the reproducing head 13 these reproduced signals are transmitted to the transmitting antenna. Since the reproducing head 13 is being pivoted with a back and forth motion according to the cam track pattern a modulation in accordance with this cam track pattern is introduced into the reproduced signals.

When the signals are transmitted to the receiving station, an apparatus similar to the one shown in the drawings is provided. These received signals are applied to the recording head 14. Since the recording head 14 is being moved back and forth in accordance with the same cam track pattern, the signals recorded by the recording head 14 on the magnetic stape 4 are demodulated so that the signals recorded on the magnetic tape correspond to the electrical signals originally recorded in the transmitting station. The magnetic tape then moves to the reproducing head 9 which reproduces these electrical signals exactly as recorded. Since the reproducing head 9 is stationary with respect to the magnetic tape it does not introduce any modulation thereon and therefore the reproduced signals from the head 9 correspond precisely to the signals originated in the transmitting station.

The erasing heads 10 and 12 are provided to clear the endless magnetic tape 4 and permit the same to be used for further recording by the heads 11 or 14 depending on whether the station is being used to transmit or receive, respectively.

In accordance with the present invention a switching mechanism is provided which permits the cam members to be shifted and thereby to change the cam track pattern. Referring now to Fig. 5 such switching mechanism will be described. It can be seen that the cam members 18 are mounted on the shaft 2 which is provided with a plurality of grooves 32 arranged parallel to the axis of the shaft 2. Each cam member is provided with detent means in a groove 30 thereof which consists of a spring 31 and a ball 33.

It can be seen that the spring 31 urges the ball 33 into a groove 32 of the shaft 2 so that the cam members 18 will rotate with the shaft 2 unless they are held or moved with a force greater than the force supplied by the respective spring 31.

Mounted at one end of the shaft 2 and freely rotatable with respect thereto is a selector plate 29 having a plurality of holes 45 therein. The selector plate 29 is urged in a counterclockwise direction by means of a schematically shown spring 34 and is held in a fixed position in this direction by means of a pin 29′ engaging a finger stop 46. The finger stop 46 may be connected to the base member 1 in a manner not otherwise shown in order to avoid unnecessarily complicating the drawings.

On the other side of the selector plate 29 is mounted a rod 38 which is arranged in a direction parallel to the shaft 2 and which is provided with an initial curved portion so as to be spaced farther away in a radial direction from the shaft 2 than the highest point of any cam track portion 19′.

Also mounted on the selector plate 29 and parallel to the rod 38 is a rotatable threaded shaft 37 having a star wheel 47 at one end thereof. Mounted on the threaded shaft 37 is a threaded nut 36 having a downwardly projecting member 35 and an upwardly projecting member 40 connected thereto. The upper projection 40 is normally urged by a spring 39 which tends to rotate the nut 36 in a clockwise direction as shown in Fig. 5. However, the projection 35 engaging the rod 38 prevents the spring 39 from rotating the nut 36 about the threaded shaft 37. The projection 35 projects downwardly below the rod 38 far enough to be below the projections 19 on the cam members 18.

Cooperating with the star wheel 47 and engaging the teeth thereof is a pawl 43 which is pivotable about a rod 42 pivotally mounted in the base member 1. The mounting of the pivotable rod 42 in the base member 1 is not shown in order to avoid unnecessarily complicating the drawing. The upper end of the pawl 43 engages a pin 43′ which is fixedly mounted in the base member 1. This mounting of the pin 43′ in the base member 1 is also not shown in order to avoid unnecessarily complicating the drawing.

It can be seen that the pawl 43 is provided with a spring 44 which tends to pivot the pawl about the rod 42 in the clockwise direction as seen in Fig. 5. However, the engagement of the upper end of the pawl 43 with the fixed pin 43′ prevents rotation of the pawl 43 in the clockwise direction.

The selecting mechanism and the changing of the cam track pattern will now be explained. It should be realized that the number of cam members 18 and the peripheral length of the individual cam track portions 19′ are so chosen that when all the cam members 18 are angularly displaced about the shaft 2 as shown in Fig. 3, the cam track portions 19′ will all cooperate to form one continuous closed cam track pattern. Therefore, for example, if there are ten cam members 18, each cam track portion 19′ thereof can extend 36° in an angular direction. The total of the ten cam members would then provide a cam track pattern having a closed 360° curve.

Similarly, as shown in Fig. 5, the opposite ends of the cam track portions 19′ are equidistant from the axis of the shaft 2. Therefore, regardless of the particular sequential angular position of the particular cam member 18, the beginning of one cam track portion 19′ will always continue the end of the previous cam track portion 19′.

In operation, at the start all of the projections 19 are aligned as shown in Fig. 5 in a manner which will be explained further hereinbelow. Similarly, the nut 36 is positioned on shaft 37 near the selector plate 29 as far as the threaded portion allows. In this position, the projection 35 is aligned in the same plane as the first cam member 18 adjacent the selector plate 29.

In this position, the selector plate 29 can be rotated through any angular position by an operator placing his finger in the proper hole 45 and rotating the selector plate 29 in the clockwise direction until the finger engages the finger stop 46 in a manner similar to the dialing mechanism in a dial telephone. It is of course necessary for this purpose to overcome the action of the spring 34.

When the finger is removed from the hole 45 the selector plate 29 is returned by the spring 34 until the pin 29′ engages the finger stop 46. During the clockwise movement of the selector plate by the manual operation, the pin 38 and shaft 37 with the nut 36 swing about shaft 2 with the selector plate 29. Therefore, the projection 35 engages the front 19″ end of the projection 19 on the first cam member 18 and moves this cam member against the action of the detent spring 31 about the shaft 2 in a clockwise direction through an angular displacement corresponding to the particular hole 45 chosen for the setting operation.

Since the star wheel 41 is moved by turning the plate 29 with the shaft 37 against the pawl 43 in a clockwise direction the pawl 43 is pivoted by the engaging tooth 47 about the rod 42 while the star wheel 41 is not rotated because shaft 37 can only rotate in clockwise direction. After the engaging tooth 47 has passed the pawl 43 the latter returns to its normal position under action of spring 44. However, when the selector plate 29 returns after dialing in the counterclockwise direction and when the star wheel 41 again engages the pawl 43 with the above mentioned tooth 47, the star wheel attempts to pivot the pawl 43 in a clockwise direction about the rod 42. Since the pawl 43 is stopped by the pin 43′ from pivoting in a clockwise direction, the pawl 43 remains in its position and the star wheel 41 is rotated by the same in clockwise direction. This rotates the threaded shaft 37 to which the star wheel is connected so that the nut 36 is moved in a direction parallel to the axis of the shaft 2.

The relative position between the shaft 37 and the finger stop 46 is so chosen that the nut 36 will be moved in the axial direction a distance corresponding exactly to the distance between adjacent cam members 18. Therefore, after the first rotation of the selector plate, the nut 36 will then be in a position to engage the second cam member 18 remote from the selector plate 29.

The dialing operation is then repeated with a different hole 45 in the selector plate 29 being engaged by the finger of the operator so that the second cam member 18 is moved through an angular displacement corresponding to the particular hole 45 that is chosen.

Similarly, each of the cam members is moved through a different angular displacement depending on the particular finger hole engaged. When all the cam members have been positioned a continuous cam track pattern is provided which can then be used to operate the modulating mechanism upon rotation of the support member 3 and the shaft 2.

When the last cam member 18 has been properly positioned by movement of the selector plate 29, the return movement of the selector plate will move the nut 36 beyond the last cam member so that the cam members 18 are free to rotate with the shaft 2 without engaging the nut 36 or its downward projection 35. It is clear that the starwheel 41 and the pawl 43 are positioned on the selector plate 29 and the base member 1, respectively so that the nut 36 will be moved an axial distance corresponding to the distance between the cam members 18 when the selector plate returns from its minimum angular displacement. That is, the positioning of the star wheel 41 and the pawl 43 will be arranged so that when the finger hole 45 corresponding to the zero digit is actuated, the rearward movement of the selector plate 29, which is the minimum rearward movement thereof, will still cause the engagement of the star wheel 41 with the pawl 43 so that the nut 36 will be properly moved one step in the axial direction.

After a particular cam track pattern has been used for a certain period and it is deemed advisable to change the cam track pattern in order to prevent any unauthorized listeners or receiving stations from possibly determining this pattern due to continuous usage thereof, the cam track pattern can be changed in the following manner. First, all of the projections 19 on the cam members 18 are axially aligned. This is done, as can be seen in Fig. 5, by an erasing mechanism including a tube 48 fixedly mounted in the base member 1, a rod 49 slidably mounted in the tube 48 and a push-button 49' connected to one end of the rod 49.

It can be seen that the rod 49 is arranged parallel to the axis of the shaft 2. Therefore when it is desired to erase the old cam track pattern, the push-button 49' is manually operated to move the rod 49 in the direction shown by the arrow 50 during the rotation of the shaft 2. The rod 49 is moved in an axial direction so that it finally extends across all of the cam members 18. Therefore, as the shaft 2 rotates with the cam members 18, each of the projections 19 one after the other engages the rod 49 which is positioned a radial distance from the shaft 2 less than that of the ends of the projections 19 of the cam members 18. After one complete rotation of the shaft 2, it is clear that all of the projections 19 will be aligned with their leading edges parallel to the axis of the shaft 2 as shown in Fig. 5.

The rod 49 is then moved in the opposite direction out of engagement with the projections 19 of the cam members 18 and the selector plate can then be manually actuated to "dial" a new cam track pattern. It is clear that any desired number of cam members and finger holes 45 may be used to provide a large number of cam track patterns.

As indicated hereinabove the electrical signals which are changed by the relative movement between the recording and reproducing heads 14, 9 and 11, 13 respectively, and the moving record carrier 4 can be transmitted from a wireless transmitting station or it can be transmitted over telephone lines or the like. If the information contained in the electrical signals is transmitted over telephone lines, there are frequency limiting conditions. That is, due to the high capacity of the conductors of the telephone lines, it is not possible to transmit very high freqeuncies over these lines.

For the above reasons it is particularly advantageous to limit the relative movement between the recording and reproducing heads and the record carrier so that no high frequency signals are introduced in the transmitted electrical signals. For this purpose the cam track pattern is so arranged that only a slight increase in the transmitted frequency takes place due to the movement of the movable head at the transmitting station.

Such slight increase in frequency is achieved by arranging the cam track pattern so that the cam track portion which corresponds to a direction of increasing relative velocity between the head and tape has a more gradual slope than the cam track portion which corresponds to decreasing relative velocity between the head and tape.

This is indicated in Fig. 4 which is a development view of a section of the cam track pattern having a plurality of cam track portions 19' illustrated therein. It can be seen that the slope 23 of the cam track portions which correspond to an increase of the relative velocity encloses a smaller angle 24 than the corresponding slope 26 of the cam track portion which produces a decrease in the relative velocity and encloses the larger angle 25. The arrow 27 indicates the direction of movement of the cam 22 and corresponds to the direction of movement indicated by the arrow 28. From Fig. 4 it can be seen that the slope 26 is a positive slope and is larger than the slope 23 which is a negative slope.

Experiments with the present invention have indicated that the most advantageous relative movement that should be introduced between the head and the record carrier to produce the best scrambling of the information sent by the electrical signals should lie in the frequency range between 2 and 10 kilocycles. In fact it has been particularly advantageous to introduce relative movement which provides frequencies in the range between 4 and 7 kilocycles.

In the illustrated embodiment, in Fig. 2, the carrier arm 7' includes two portions 7 and 8 which respectively support or carry the reproducing head 13 and the recording head 14. It is possible to make the carrying arm 7' into two separate carrying arms, one which supports the reproducing head 13 and the other of which supports the recording head 14. In this manner it is possible to provide a separate cam follower and control member for each recording and reproducing head. Thus, the cam followers for the respective heads can be spaced from each other to permit differences in the relative movement between the recording head and the reproducing head so that the spacing can compensate for any time delay between a message transmitted from one station and received at another station. It is apparent that the base members 5 at all the authorized receiving and transmitting stations are rotated with precisely the same speed of rotation. This is most advantageously done by synchronous motor or the like.

In the discussion of the specific embodiments of the present invention it has been indicated that the peripheral distance between the leading and trailing edges of the projections 19 of each of the cam members 18 corresponds to the number of cam members 18 so that all of the cam members are used to produce one continuous closed cam track pattern. However, it is apparent that if additional cam members are provided with additional cam track portions, it is possible to arrange the additional cam members so that their cam track portions are not actually used. This permits an additional arrangement wherein different ones of the cam members are not used and only some of the cam members are used to produce the continuous closed cam track pattern. This increases the number of possible cam track patterns available with the present invention.

In still another embodiment, it is possible to shift the cam members after each revolution of the shaft 2 so that a new cam track pattern is automatically formed each time that the shaft 2 rotates. It should be appreciated that such an arrangement would be even more difficult for unauthorized listeners or stations to unscramble.

In still another embodiment of the present invention each cam member is provided with a complete cam track pattern covering 360° of the circumference of the cam member. With this embodiment the cam follower only engages one cam member at a time and after it has completed a full rotation, the cam follower then moves into engagement with the next cam member so that the cam follower sequentially engages all of the cam members for one entire period of revolution and then moves on to the next cam member. In such an arrangement the shaft 2 can be made to move only one of the cam members at a time in sequence.

It will be understood that each of the elements described above, or two or more together, may also find a useful application in other types of control arrangements differing from the types described above.

While the invention has been illustrated and described as embodied in variable scrambling and unscrambling apparatus for use in the transmission and reception of information by electrical signals, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptions should and are intended to be comprehended within the meaning and range of equivalence of the following claims.

What is claimed as new and desired to be secured by Letters Patent is:

1. Variable scrambling and unscrambling apparatus for use in the transmission and reception of information by electrical signals, comprising, in combination, a base member; a support member mounted on said base member; a composite cam track composed of a plurality of individual mutually displaceable cam members, each of said cam members having a cam portion constituting a component part of said cam track; means for positioning said individual cam members in a variety of different positions relatively to each other in each of which the total number of said cam portions of said cam members sequentially in longitudinal direction of the track constitutes said composite track, the pattern of said track being variable depending upon different combinations of the relative positions of said cam members; at least one cam follower movably mounted on said base member and adapted to engage said composite cam track; means for providing relative movement between said cam follower and said composite cam track along the latter so that said cam follower is moved by said composite cam track transversely thereof in accordance with the particular cam track pattern; and electrical signal recording and reproducing means mounted on said base member and controlled by said cam follower to vary the reproduction and recording of said electrical signals in accordance with said cam track pattern thereby respectively scrambling and unscrambling said electrical signals.

2. Variable scrambling and unscrambling apparatus for use in the transmission and reception of information by electrical signals, comprising, in combination, a base member; a support member mounted on said base member; a composite cam track composed of a plurality of individual mutually displaceable cam members, each of said cam members having a cam portion constituting a component part of said cam track; means for positioning said individual cam members in a variety of different positions relatively to each other in each of which the total number of said cam portions of said cam members sequentially in longitudinal direction of the track constitutes said composite track, the pattern of said track being variable depending upon different combinations of the relative position of said cam members; at least one cam follower movably mounted on said base member and adapted to engage said composite cam track; means for providing relative movement between said cam follower and said composite cam track so that said cam follower is moved by said composite cam track transversely thereof in accordance with the particular cam track pattern; a record carrier mounted on said base member and adapted to have electrical signals recorded thereon and reproduced therefrom; at least one recording head mounted on said base member for recording electrical signals on said record carrier; at least one reproducing head mounted on said base member for reproducing electrical signals from said record carrier; and a control member connected between said cam follower and at least one of said heads for moving said one head in accordance with said particular cam track pattern to vary the electrical signals occurring at said one head in accordance with said particular cam track pattern.

3. Variable scrambling and unscrambling apparatus for use in the transmission and reception of information by electrical signals, comprising, in combination, a base member; a support member mounted on said base member; a composite cam track composed of a plurality of individual mutually displaceable cam members, each of said cam members having a cam portion constituting a component part of said cam track; means for positioning said individual cam members in a variety of different positions relatively to each other in each of which the total number of said cam portions of said cam members sequentially in longitudinal direction of the track constitutes said composite track, the pattern of said track being variable depending upon different combinations of the relative positions of said cam members; at least one cam follower movably mounted on said base member and adapted to engage said composite cam track; means for providing relative movement between said cam follower and said composite track along the latter so that said cam follower is moved by said composite cam track in accordance with the particular cam track pattern; a record carrier mounted on said base member and adapted to have electrical signals recorded thereon and reproduced therefrom; at least one carrying arm movably mounted on said base member and having spaced end portions adjacent said record carrier; at least one recording head mounted on one end portion of said carrying arm for recording electrical signals on said record carrier; at least one reproducing head mounted on another end portion of said carrying arm for reproducing electrical signals from said record carrier; and a control member connected between said cam follower and said carrying arm for moving said carrying arm in accordance with said particular cam track pattern to vary the electrical signals occurring at said recording and reproducing heads in accordance with said particular cam track pattern.

4. Variable scrambling and unscrambling apparatus for use in the transmission and reception of information by electrical signals, comprising, in combination, a base member; a shaft mounted on said base member; a composite cam track composed of a plurality of disc-shaped cam members carried by said shaft, each of said cam members respectively having a sectorial cam track portion at the periphery thereof and constituting a component part of said cam track; means for angularly orienting said disc-shaped cam members on said shaft to a plurality of different mounting positions relative to each other, said cam members being mounted coaxially and substantially parallel to each other in such a manner that said cam track portions at the outer periphery thereof sequentially in peripheral direction constitute as a group said composite cam track the pattern of said cam track being variable depending upon different combinations of the relative mounting positions of said cam members; at least one cam follower movably mounted on said base member and adapted to engage said cam track composed of said group of cam track portions; means for providing relative movement between said cam follower and said composite cam track along the latter so that said cam follower is moved radially by said composite cam track in accordance with the particular cam track pattern; a record carrier mounted on said base member and adapted to have electrical signals recorded thereon and reproduced therefrom; at least one recording head mounted on said base member for recording electrical signals on said record carrier; at least one reproducing head mounted on said base member for reproducing electrical signals from said record carrier; and a control member connected between said cam follower and at least one of said heads for moving said one head in accordance with said particular cam track pattern to vary the electrical signals occurring at said one head in accordance with said particular cam track pattern.

5. Variable scrambling and unscrambling apparatus for use in the transmission and reception of information by electrical signals, comprising, in combination, a base member; a shaft mounted on said base member; a composite cam track composed of disc-shaped cam members carried by said shaft, each of said cam members respectively having a sectorial cam track portion at the periphery thereof and constituting a component part of said cam track; means for angularly orienting said disc-shaped cam members on said shaft to a plurality of different mounting positions relative to each other, said cam members being mounted coaxially and substantially parallel to each other in such a manner that said cam track portions at the outer periphery thereof sequentially in peripheral direction constitute as a group said composite cam track, the pattern of said cam track being variable depending upon different combinations of the relative mounting positions of said cam members; at least one cam follower movably mounted on said base member and adapted to engage said cam track composed of said group of cam track portions; means for providing relative movement between said cam follower and said composite cam track along the latter so that said cam follower is moved radially by said composite cam track in accordance with the particular cam track pattern; a record carrier mounted on said base member and adapted to have electrical signals recorded thereon and reproduced therefrom; at least one carrying arm movably mounted on said base member and having spaced end portions adjacent said record carrier; at least one recording head mounted on one end portion of said carrying arm for recording electrical signals on said record carrier; at least one reproducing head mounted on another end portion of said carrying arm for reproducing electrical signals from said record carrier; and a control member connected between said cam follower and said carrying arm for moving said carrying arm in accordance with said particular cam track pattern to vary the electrical signals occurring at said recording and reproducing heads in accordance with said particular cam track pattern.

6. Variable scrambling and unscrambling apparatus for use in the transmission and reception of information by electrical signals, comprising, in combination, a base member; a shaft mounted on said base member; a composite cam track composed of a plurality of disc-shaped cam members carried by said shaft, each of said cam members respectively having a sectorial cam track portion at the periphery thereof and constituting a component part of said cam track; means for angularly orienting said disc-shaped cam members on said shaft to a plurality of different mounting positions relative to each other, said cam members being mounted coaxially and substantially parallel to each other in such a manner that said cam track portions at the outer periphery thereof sequentially in peripheral direction constitute as a group said composite cam track, the pattern of said cam track being variable depending upon different combinations of the relative mounting positions of said cam members; a switching mechanism mounted on said base member and adapted to sequentially engage each of said cam track portions of each of said cam members and move the same angularly into selected angular positions about said shaft in a predetermined manner to provide said different cam track patterns by different angular displacements of each of said cam track portions relative to each other; at least one cam follower movably mounted on said base member and adapted to engage said composite cam track; means for providing relative movement between said cam follower and said composite cam track along the latter so that said cam follower is radially moved by said composite cam track in accordance with the particular cam track pattern; a record carrier mounted on said base member and adapted to have electrical signals recorded thereon and reproduced therefrom; at least one carrying arm movably mounted on said base member and having spaced end portions adjacent said record carrier; at least one recording head mounted on one end portion of said carrying arm for recording electrical signals on said record carriers; at least one reproducing head mounted on another end portion of said carrying arm for reproducing electrical signals from said record carrier; and a control member connected between said cam follower and said carrying arm for moving said carrying arm in accordance with said particular cam track pattern to vary the electrical signals occurring at said recording and reproducing heads in accordance with said particular cam track pattern.

7. Apparatus as claimed in claim 1, wherein said cam portion of each of said cam members is formed with at least one curved section having a rising slope and a falling slope, the slope rising in the direction of the relative movement of said composite cam track having a smaller slope angle than said falling slope.

8. Apparatus as claimed in claim 6, wherein said cam portion of each of said cam members is formed with at least one curved section having a rising slope and a falling slope, the slope rising in the direction of the relative movement of said composite cam track having a smaller slope angle than said falling slope.

References Cited in the file of this patent

UNITED STATES PATENTS

| | | |
|---|---|---|
| 1,749,744 | Rae | Mar. 4, 1930 |
| 2,079,130 | O'Brien | May 4, 1937 |
| 2,116,683 | Lemmon et al. | May 10, 1938 |
| 2,352,023 | Schuller | June 20, 1944 |
| 2,644,119 | Harris | June 30, 1953 |
| 2,690,473 | Cooley | Sept. 28, 1954 |
| 2,753,034 | Hill | July 3, 1956 |
| 2,773,120 | Masterson | Dec. 4, 1956 |
| 2,794,851 | Morris | June 4, 1957 |
| 2,797,260 | Rosehke | June 25, 1957 |